US012412185B2

(12) United States Patent
Stewart (10) Patent No.: US 12,412,185 B2
(45) Date of Patent: Sep. 9, 2025

(54) AUTOMATED AGGREGATION AND TRACKING OF VOTER STANCES ON ISSUES AND CANDIDATE RECORDS

(71) Applicant: David James Stewart, Zephyr Cove, NV (US)

(72) Inventor: David James Stewart, Zephyr Cove, NV (US)

( * ) Notice: Subject to any disclaimer, the term of this patent is extended or adjusted under 35 U.S.C. 154(b) by 0 days.

(21) Appl. No.: 17/672,311

(22) Filed: Feb. 15, 2022

(65) Prior Publication Data

US 2023/0274290 A1 Aug. 31, 2023

Related U.S. Application Data

(60) Provisional application No. 63/149,475, filed on Feb. 15, 2021.

(51) Int. Cl.
*G06F 21/31* (2013.01)
*G06Q 30/02* (2023.01)
*G06Q 30/0201* (2023.01)

(52) U.S. Cl.
CPC ......... *G06Q 30/0201* (2013.01); *G06F 21/31* (2013.01)

(58) Field of Classification Search
CPC ...................................................... G06F 21/31
See application file for complete search history.

(56) References Cited

U.S. PATENT DOCUMENTS

| 2007/0067322 | A1* | 3/2007 | Harrison, Jr. | G06Q 50/26 |
| 2007/0233552 | A1* | 10/2007 | Maggio | G06Q 10/00 |
| | | | | 705/12 |
| 2008/0048032 | A1* | 2/2008 | Bordier | G06Q 30/0201 |
| | | | | 235/386 |
| 2010/0185641 | A1* | 7/2010 | Brazier | G06Q 50/26 |
| | | | | 707/758 |

(Continued)

FOREIGN PATENT DOCUMENTS

WO   WO-2013043945 A1 *  3/2013  ........... G06Q 10/103

OTHER PUBLICATIONS

H. V. Purandare, A. R. Saini, F. D. Pereira, B. Mathew and P. S. Patil, "Application for Online Voting System Using Android Device," 2018 International Conference on Smart City and Emerging Technology (ICSCET), Mumbai, India, 2018, pp. 1-5 (Year: 2018).*

*Primary Examiner* — Jerry O'Connor
*Assistant Examiner* — Philip N Warner
(74) *Attorney, Agent, or Firm* — Goodman Law Center, P.C.

(57) ABSTRACT

A system and associated methods are provided that are intended to be used by citizens to record their stances on relevant issues in a permanent distributed ledger, to organize these stances into non-personally identifiable aggregations to demonstrate the collective stance of a group of citizens and their priority ranking for several issues, and use this information regarding stances to identify alignment or misalignment between a candidate and a citizen or a group of citizens eligible to vote for that candidate. The system can (Continued)

therefore provide aggregated issue stances and issue priority ranking information for a jurisdiction. Alternatively, the system can help a user who is verified as an eligible citizen to determine which candidate is most closely aligned with the user's stances on issues and priority ranking of issues.

19 Claims, 9 Drawing Sheets

(56) References Cited

U.S. PATENT DOCUMENTS

| | | | | |
|---|---|---|---|---|
| 2012/0029979 | A1* | 2/2012 | Singh | G06Q 10/00 715/234 |
| 2013/0013380 | A1* | 1/2013 | Brower | G06Q 30/02 705/12 |
| 2013/0151240 | A1* | 6/2013 | Myslinski | G06Q 50/01 704/9 |
| 2014/0075004 | A1* | 3/2014 | Van Dusen | G06F 16/90335 709/223 |
| 2014/0081717 | A1* | 3/2014 | Lu | G06Q 10/06393 705/12 |
| 2014/0164994 | A1* | 6/2014 | Myslinski | G06F 3/04817 715/808 |
| 2014/0207694 | A1* | 7/2014 | Vickery | G06Q 30/018 705/317 |
| 2014/0253727 | A1* | 9/2014 | Sadrieh | H04N 21/2743 348/143 |
| 2015/0106170 | A1* | 4/2015 | Bonica | G06F 16/24578 705/12 |
| 2017/0301168 | A1* | 10/2017 | Banke | G07C 13/00 |
| 2018/0350180 | A1* | 12/2018 | Onischuk | G07C 13/00 |
| 2019/0130424 | A1* | 5/2019 | Greenfield | G06Q 30/0201 |
| 2019/0288846 | A1* | 9/2019 | Zawierka | G06Q 30/00 |
| 2020/0258338 | A1* | 8/2020 | Goswami | H04L 63/12 |
| 2021/0248688 | A1* | 8/2021 | Schutt | G06Q 50/26 |
| 2022/0051503 | A1* | 2/2022 | Joao | G06F 16/2365 |

* cited by examiner

AUTOMATED AGGREGATION AND TRACKING OF VOTER STANCES ON ISSUES AND CANDIDATE RECORDS

SUMMARY OF THE INVENTION

The present invention is generally related software and a software-as-a-service (SAAS) platform for receiving, organizing, and displaying voter stances on issues, and more particularly related to software and a software-as-a-service platform for receiving voter stances on issues and aggregating the voter stances on issues to formulate a non-personally identifiable record of the public opinion of verified citizens who are eligible to vote.

A system and associated methods are provided that are intended to be used by citizens to record their stances on relevant issues in a permanent distributed ledger, to organize these stances into non-personally identifiable aggregations to demonstrate the collective stance of a group of citizens and their prioritization of several issues, and use this information regarding stances to identify alignment or misalignment between a candidate and a citizen or a group of citizens eligible to vote for that candidate. The system can therefore provide aggregated issue stance and issue prioritization information for a jurisdiction. Alternatively, the system can help a user who is verified as an eligible citizen to determine which candidate is most closely aligned with the user's stances on issues and prioritization of issues.

In a preferred embodiment, a system for aggregating stances on issues for a plurality of voters and for a plurality of issues includes a verification system interface for authenticating a user's identity; a user interface for receiving one or more inputs from the user and for displaying stance on issues, issue prioritization, aggregated stances on issues, and aggregated issue prioritization; a distributed permanent ledger, that may be a blockchain in certain embodiments, for storing a permanent record of all transactions; and a citizen issue ranking and stance interface; a citizen issue ranking and stance interface in communication with the verification system, the user interface, and the distributed permanent ledger so that stance on issues and issue prioritization of a user who is verified as an eligible citizen by the verification system interface are recorded in the distributed permanent ledger and retrievable and viewable through the user interface; and a public opinion interface for anonymizing and aggregating stance on issues and issue prioritization so that they may be displayed without individually identifying any one eligible citizen's stances on issues or prioritization.

Preferably, the present invention utilizes a blockchain as the distributed permanent ledger. In alternative embodiments, the present invention may utilize a non-blockchain database such as a relational database to store a record of all transactions carried out by the system.

The herein disclosed software may alternatively be described as one or more methods for aggregating stances on issues for a plurality of voters for a plurality of issues. In a preferred embodiment, the methods include the steps of: authenticating a user's identity through a secured multifactor identify verification interface by receiving credentials from the user; for a first issue, receiving a first issue stance and a first issue prioritization from a user who is verified as an eligible citizen of a jurisdiction; for a second issue, receiving a second issue stance and a second position prioritization from the user who is verified as the eligible citizen of the jurisdiction; recording the first issue stance, the first issue prioritization, the second issue stance, and the second issue prioritization in the distributed permanent ledger; receiving data for a candidate for elected office; recording the data for the candidate for elected office in the distributed permanent ledger; anonymizing the stances on issues and issue prioritizations stored in the distributed permanent ledger so that the stances on issues and the issue prioritizations can be analyzed without disclosing any identities; and aggregating the stances on issues and issue prioritizations to form an aggregated stance for the first issue, an aggregated stance for the second issue, and an aggregated issue prioritization that ranks the first issue and the second issue by their respective priorities within the jurisdiction. The system can utilize any number of issues including more than two issues. For example, some circumstances may involve analysis of only a single issue and citizen stances on the single issue, whereas other circumstances may involve receiving, organizing, and presenting a large number of issues beyond only a first issue and a second issue.

The herein disclosed software is intended to enable citizens in democratic societies to collectively voice and communicate their stances and positions on issues with elected officials and candidates for public office. The present invention enables the voting public to collectively show a record of the will of the people, as well as discrepancies between a candidate's actions while in office (if the candidate of elected office is an incumbent candidate or former holder of a different office) and the will of eligible citizens. The present invention also enables a citizen to easily understand one or more candidate stances on issues so that the citizen may make an informed decision when voting without the need to resort to voting solely by party affiliation.

Certain embodiments of the system provide eligible citizens with a system to store both their stance on a particular issue as well as their personalized ranking of importance or priority of the particular issue in comparison to other issues. Issue priority ranking, as well as stances on issues can then be aggregated at local/municipal, county, state, federal and even global levels so as to allow public opinion on any particular issue to be accurately and easily quantified at any level and jurisdiction of democratic government.

It should be noted that the systems and method provided herein may be advantageously utilized in additional contexts beyond elections for public office. The herein disclosed system and methods may be utilized to gather personalized information, organize the information in a permanent distributed ledger, and present aggregated and/or anonymized versions of the information for various types of situations; for example, regarding preference for a new boss or executive at a private business entity or regarding stances related to a public referendums unrelated to a particular elected office.

The system may include an interface allowing candidates for elected office to directly input their stances on issues and prioritization of issues. Candidates for elected office can be encouraged to make their stances and ranking of issue public to promote transparency and clarity. Alternatively, candidate stances on issues and issue prioritization can be inferred, deduced, or transcribed from outside sources if the candidate themselves are unable or unwilling to directly input their stances on issues and prioritization of issues.

The system may allow eligible citizens the ability to quickly view their own stances on issues in relation to a candidate for elected office's stances on issues. In this way, eligible citizens can easily view alignment or misalignment on issues ranked by their personal issue priority ranking or sorted and ranked by the candidate issue priority, for example. As can be seen in the various drawing figures, a simple and easy to understand user interface quickly illustrates alignment with a candidate, by issue, enabling eligible citizens who vote to make an informed decision at the polls without needing to perform hours (or days) of research on candidates or resorting to political party affiliation to make their decision.

In a preferred embodiment, candidates for elected office can be rated for integrity over time. For example, if a candidate's stances on issues tend to change back and forth over time, or their stances are otherwise unreliable, the software platform can track this change over time. An integrity score for each candidate for elected office can be calculated and communicated to the public (or to users of the system) to help eligible citizens make informed decisions.

In an alternative embodiment, a public servant score can be generated for every elected official using a scoring based upon alignment between an elected official's issue stances, issue ranking, voting record, legislation and legislation proposals and public opinion. Flip-flop rates and follow through (based on public campaign promises) scoring may also be used to define the elected official's public servant score or grade (which may be referred to as a public service grade or a public servant grade). Preferably, a user can customize the user's own scoring algorithm using slider/toggle controls to change the weight that each criteria carries in the algorithm.

A proposed alternative embodiment of the system may be capable of receiving and/or tabulating real votes for an election. For example, all users will show verifiable proof of identity to register and vote on issues and candidates for elected office. Regular multifactor authentication, which could include biometrics, may be used to authenticate a user's identity. Permanent ledger blockchain or alternative distributed ledger technology allows for data to be rolled back in the event of a breach of a user's account.

CROSS-REFERENCES TO RELATED APPLICATIONS

This non-provisional utility application takes priority to the previously filed provisional application: Application No. 63/149,475 filed on Feb. 15, 2021 by inventor David James Stewart, which is hereby incorporated in its entirety by reference.

BACKGROUND OF THE INVENTION

Many techniques have been developed to attempt to determine how a particular group of people eligible to vote in an upcoming election will actually vote in the election. For example, public polling has been used for decades to forecast the vote for upcoming elections for public office or for public issue referendums. Polling takes many different forms and the accuracy of polls can vary widely based upon the polling methodology. But heretofore, most polling suffers from a lack of authentication of the subjects of the poll. In a live-caller phone poll, which is generally considered to be the most effective methodology for polling, there is generally no attempt made to authenticate the identity of the polling subject or the geographic location of the polling subject. This lack of authentication leaves open the possibility of poll manipulation by unscrupulous actors who may wish to utilize inaccurate polling advance a particular agenda.

It would therefore be advantageous to provide a system for receiving, organizing, and displaying voter stances on issues (and issue prioritization) wherein the voters' identities are authenticated before the voters' stances on issues and issue prioritization are added to the database and used for anonymized aggregation of public opinion. The present invention provides just such a system that is capable of authenticating users to determine if the users are eligible citizens whose opinions should be added to the database and used for demonstrating public opinion in the form of aggregated and anonymized data related to stances on relevant issues (and ranking or prioritization of the issues).

DETAILED DESCRIPTION OF THE INVENTION

Figure 1:
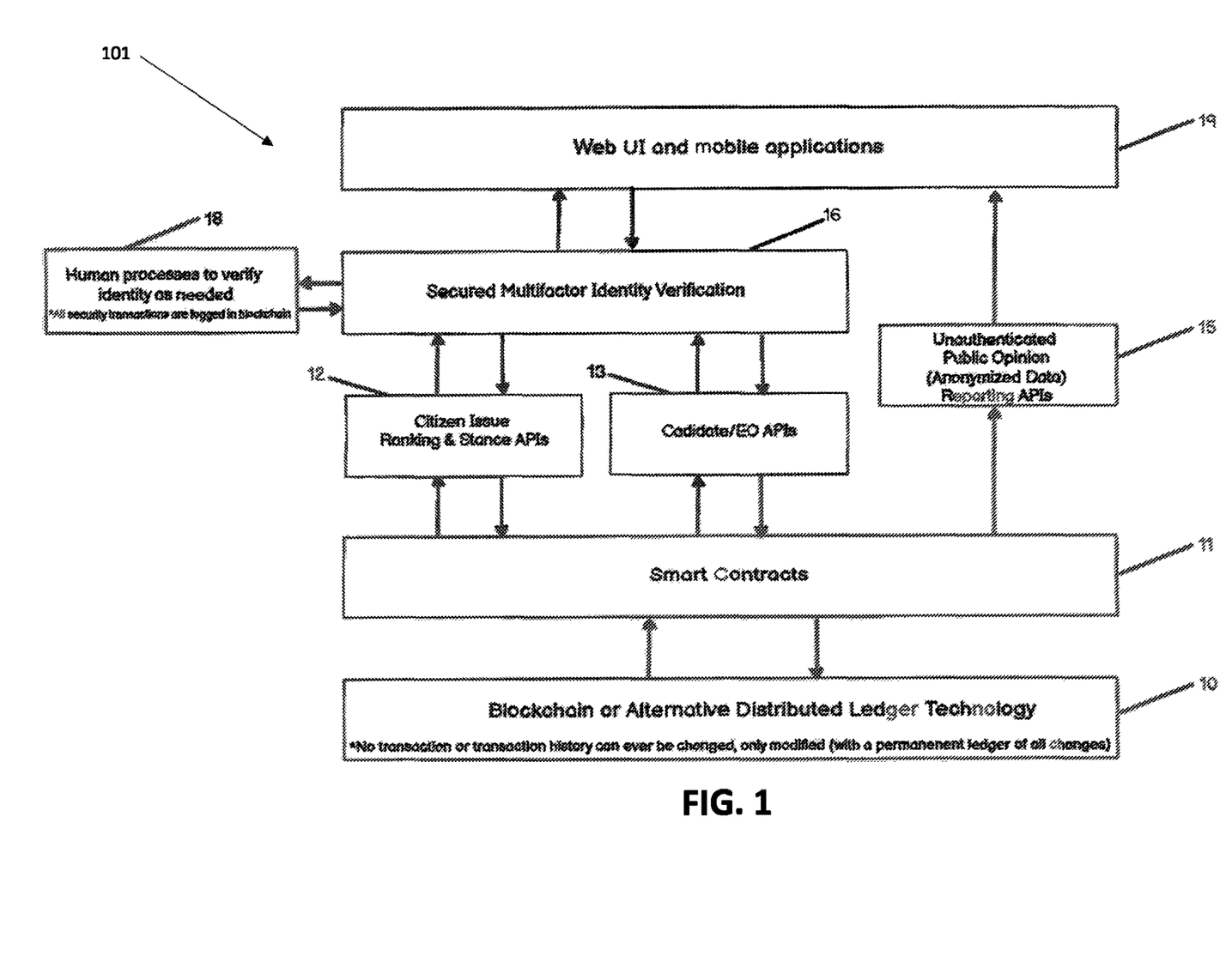
FIG. 1 illustrates a general overview of the herein disclosed system for aggregating stance on issues and issue prioritization, wherein the system utilizes a blockchain distributed ledger as a permanent record of all transactions, in accordance with an exemplary embodiment of the present invention.

The present invention is a system for aggregating stances on issues for a plurality of voters for a plurality of issues, and for aggregating issue prioritization for the plurality of issues, to demonstrate issue prioritization for an electorate. A preferred embodiment of the system is shown in FIG. 1 wherein system 101 stores a record of all transactions that are carried out on system 101 on distributed ledger 10. In this embodiment, distributed ledger 10 may be any type of electronic record keeping that establishes a permanent record after verification of the authenticity of the data; for example, distributed ledger 10 may be a blockchain. An alternative embodiment of the herein disclosed system is shown in FIG. 2 wherein system 102 stores a record of all transactions that are carried out on system 102 on a traditional relational database.

Referring to FIG. 1, a general overview of system 101 for aggregating stances on issues for a plurality of voters for a plurality of issues, and for aggregating issue prioritization for the plurality of issues, to demonstrate issue prioritization for an electorate, is shown wherein the system utilizes distributed ledger technology to track and record all transactions. Distributed ledger 10 provides a permanent ledger of all transactions, including all citizen and candidate issue prioritization ranking and stance on issues changes as well as all security and administrative transactions. Smart contracts 11 are defined using standardized security protocols and released for each transaction when security and authorization has been verified. Citizen issue ranking and stance interface 12 manages the business logic required to enable system 101 to receive issue ranking and stances from eligible citizens, as well as providing reporting on identifiable citizen issue rankings and stance data. Candidate for elected office interface 13 enables reception of candidate data, such as documented campaign contributions, public statements and media related to specific issues, legislative voting records and actions while in office or while campaigning for office. This candidate data may be directly input by a candidate for elected office or, alternatively, the candidate data may be input by another user or even inferred or imputed from other publicly available information in cases wherein the candidate refuses to directly participate by interacting with the herein disclosed system. Public opinion interface 15 provides reporting on aggregated anonymized data to demonstrate, for example, current public opinion or public opinion for a specified time period. Public opinion is a general term which refers to a received sample of verified eligible citizen voter data that has been input through system 101. This public opinion may take the form of aggregated stance on issues, or priority of issues, for a plurality of eligible citizen voters. Public opinion can be aggregated and displayed by jurisdiction to present aggregated issue ranking, stances on issues, and candidate favorability for example.

Authentication of users of the system 101 is carried out via secured multifactor identify verification system 16 and is similar to systems currently used in financial and government industries and can be used to securely authenticate a user's identity. In the event of a security breach of a user account, transactions can be rolled back in distributed ledger 10 based upon the time of the security events. In certain embodiments, security can be enhanced through the addition of human security processes 18, which may be employed to further verify identity as needed, to initially verify the identity of new users as needed, and/or to roll back transactions in the distributed ledger in the event of an account breach.

Figure 2:
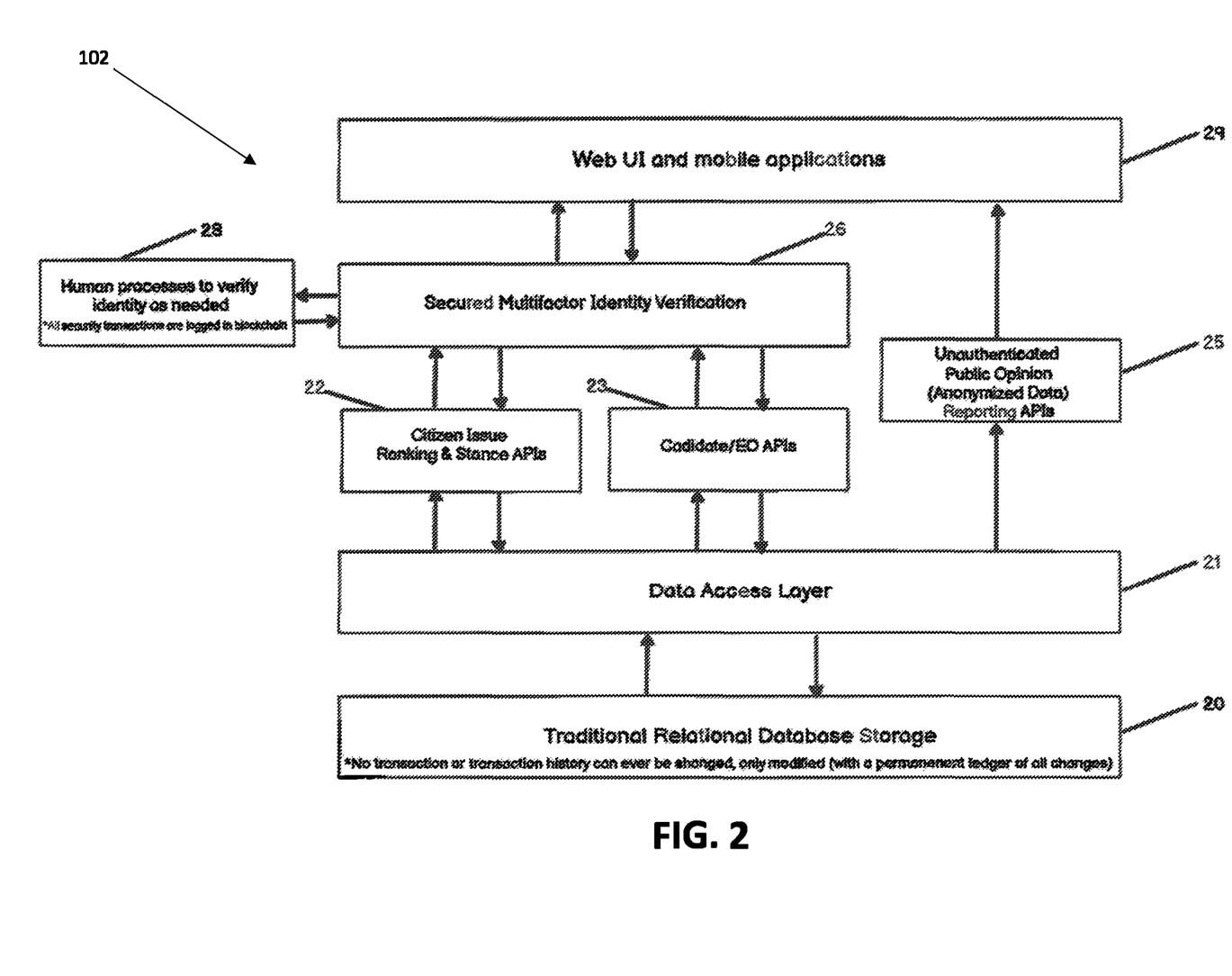
FIG. 2 illustrates a general overview of the herein disclosed system for aggregating stance on issues, wherein the system utilizes a traditional relational database as a permanent record of all transactions, in accordance with an exemplary embodiment of the present invention.

In a preferred embodiment and as shown in FIG. 1 and FIG. 2, all data and reporting may be presented to users (which may be eligible citizen voters, verified candidates for elected office, or other authorized persons having viewing access only) via user interface 19 (which may include a mobile app). Various security and identity verification methods can be facilitated by user interface 19, including for example strong passwords, biometrics, internet protocol addresses, SMS/phone call code delivery, government identification photographs and scanning.

Referring to FIG. 2, system 102 for aggregating stances on issues for a plurality of voters for a plurality of issues, and for aggregating issue prioritization for the plurality of issues, to demonstrate issue prioritization for an electorate, is shown wherein the system utilizes relational database 20 for storage of system transactions. Database 20 provides a permanent ledger of all transactions, including all citizen and candidate issue prioritization ranking and stance on issues changes as well as all security and administrative transactions. Data access layer 21 utilizes standardized security protocols and database transactions are authorized when security and authorization have been verified.

Citizen issue ranking and stance interface 22 manages the business logic required to enable system 101 to receive issue ranking and stances from eligible citizens, as well as providing reporting on identifiable citizen issue rankings and stance data. Candidate for elected office interface 23 enables reception of candidate data, such as documented campaign contributions, public statements and media related to specific issues, legislative voting records and actions while in office or while campaigning for office. This candidate data may be directly input by a candidate for elected office or, alternatively, the candidate data may be input by another user or even inferred or imputed from other publicly available information in cases wherein the candidate refuses to directly participate by interacting with the herein disclosed system. Public opinion interface 25 provides reporting on aggregated anonymized data to demonstrate, for example, current public opinion or public opinion for a specified time period. Public opinion is a general term which refers to a received sample of verified eligible citizen voters that has been input through system 102. This public opinion may take the form of aggregated stance on issues for a plurality of eligible citizen voters. Public opinion can be aggregated and displayed by jurisdiction to present aggregated issue ranking, stances on issues, and candidate favorability for example.

The remaining components of system 102 are similar to the components of system 101. Authentication of users of the system 102 is carried out via secured multifactor identify verification system 26 and is similar to systems currently used in financial and government industries and can be used to securely authenticate a user's identity. In the event of a security breach of a user account, transactions can be rolled back in database 20 based upon the time of the security events. In certain embodiments, security can be enhanced through the addition of human security processes 28, which may be employed to further verify identity as needed, to initially verify the identity of new users as needed, and/or to roll back transactions in the database 20 in the event of an account breach.

All data and reporting may be presented to users (which may be eligible citizen voters, candidates for elected office, or other authorized persons having viewing access only) via user interface 29 (which may include a mobile app). Various security and identity verification methods can be facilitated by user interface 29, including for example strong passwords, biometrics, internet protocol addresses, SMS/phone call code delivery, government identification photographs and scanning.

Figure 3:
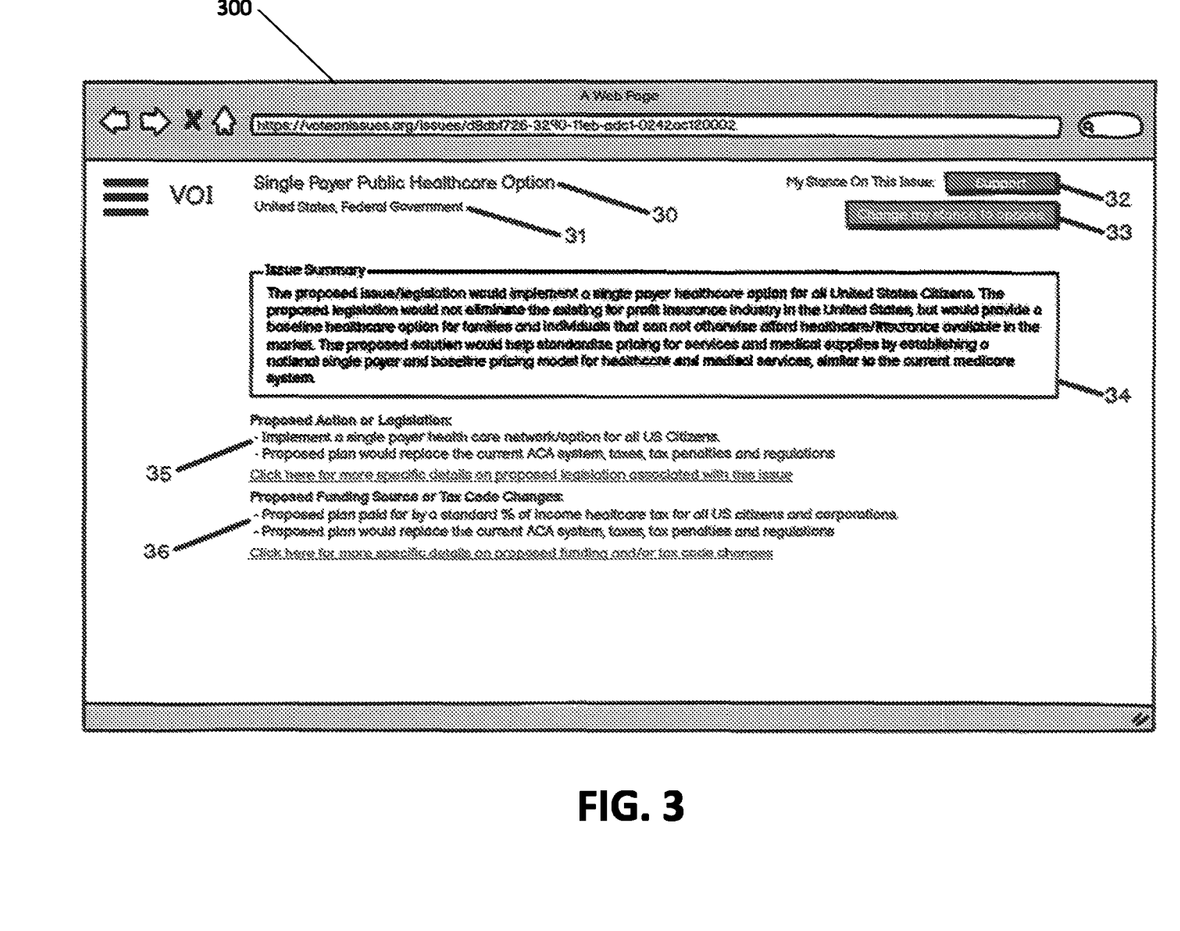
FIG. 3 illustrates an exemplary screenshot of an user interface, showing a specific issue for an authenticated voting eligible citizen, in accordance with an exemplary embodiment of the present invention.

Referring to FIG. 3, an exemplary issue summary user interface 300 is shown. The issue short description 30 is prominently displayed at the top of the page. The applicable jurisdiction 31 for this issue is displayed below issue short description 30. The currently authenticated user's stance 32 on this is first issue is displayed in the top right. A change stance button 33 is displayed below to allow the user to change their stance on the issue. A confirmation dialog can be displayed to confirm before a user stance is changed. A brief summary of the issue 34 is displayed to summarize the issue and related information. Links to supporting information can be include in this section at 34. All linked data and information may be verified as factual and free from opinion (with some exceptions for opinions of verified experts in the field). A section summarizing proposed action or legislation 35 is displayed below the summary 34. Proposed action or legislation 35 explains to the user the proposed outcome of supporting or opposing the issue. Links to supporting information and data verified as factual can also be included in this section at 35. A section summarizing funding sources or proposed tax changes 36 to fund the proposed actions is also shown. Funding sources or proposed tax changes 36 summarizes how the proposed action or legislation will be paid for. Links to supporting information and data verified as factual can also be included in this section at 36.

Figure 4:
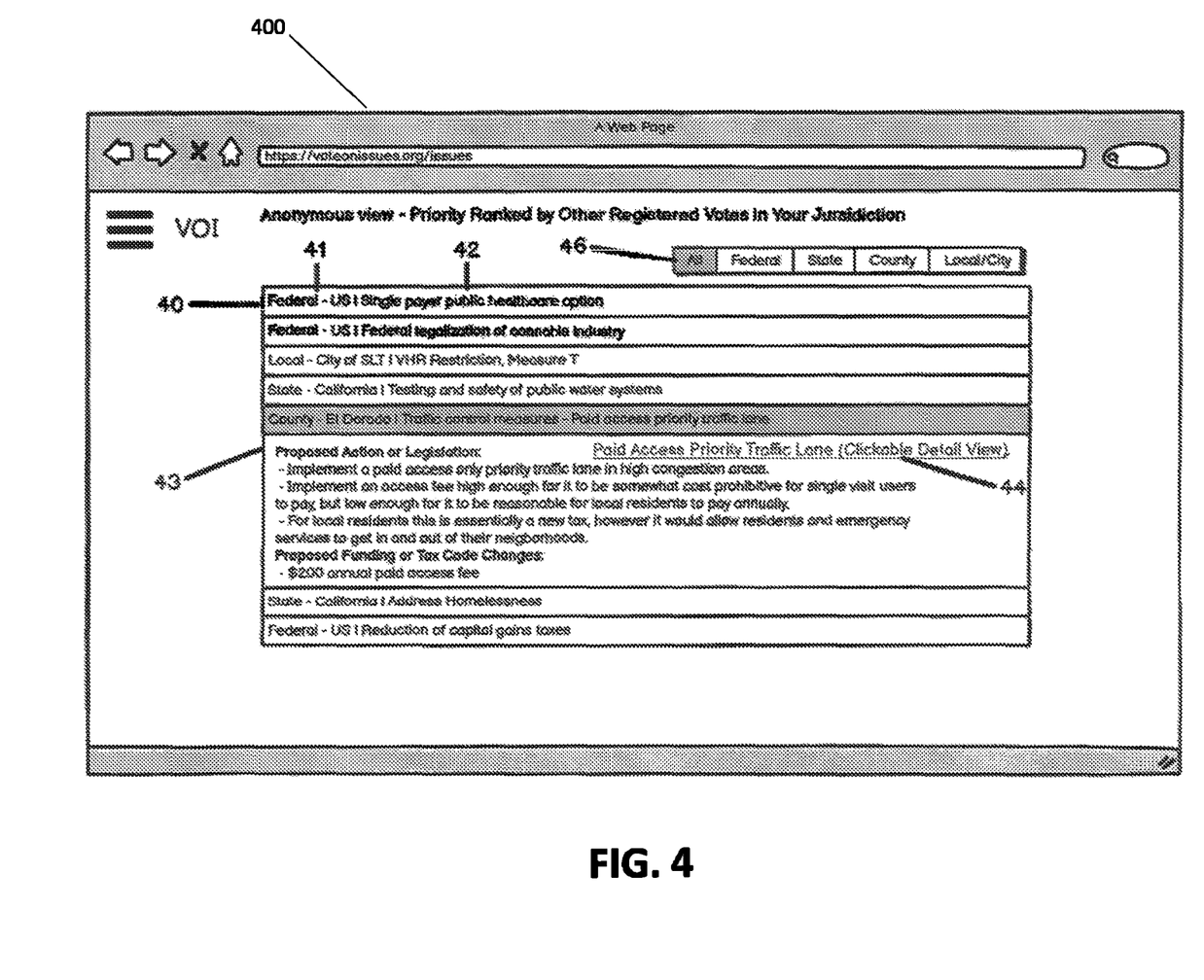
FIG. 4 illustrates an exemplary screenshot of an user interface, showing an anonymous view of aggregated prioritization for a jurisdiction, in accordance with an exemplary embodiment of the present invention.

Referring to FIG. 4, shows an example screenshot of an aggregated issue prioritization list 400 for a particular jurisdiction (described in the screenshot as "your jurisdiction", meaning the jurisdiction of the user). The list can be filtered using the jurisdiction filter control 46. Please note that the design of the jurisdiction filter 40 shown here is for illustration purposes only. Alternative methods and controls could be used to filter the list, including maps and multi-level drop downs for parent-child jurisdiction relationships. Row item displays an issue in a collapsed form. In the collapsed form, row item 40 simply shows the name/short description of the issue 42 and the applicable jurisdiction 41. List item or row 43 illustrates an example of an expanded issue view. The expanded view displays a brief summary of the proposed action/legislation and funding sources. An in-depth detail view of the issue can be displayed using the clickable detail view link 44.

Figure 5:
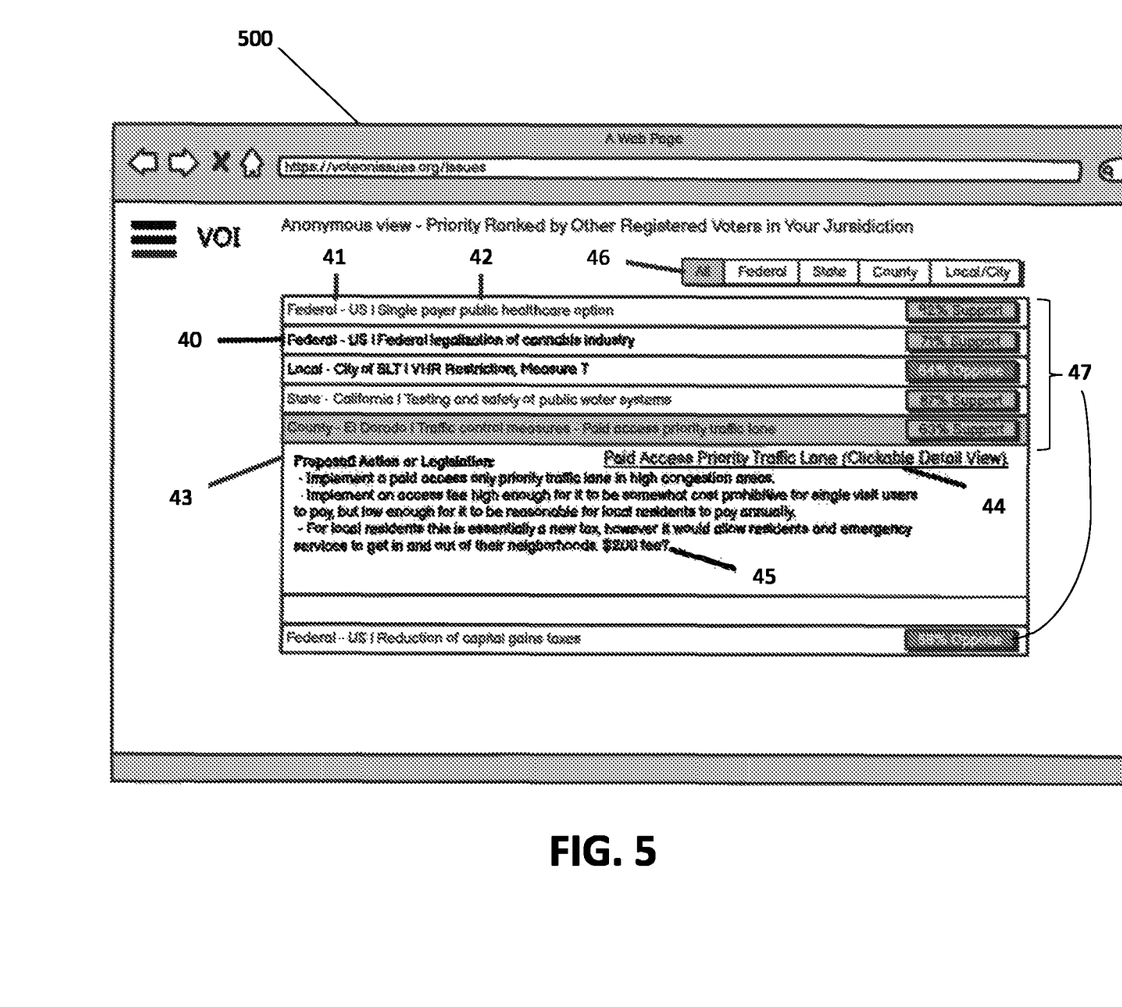
FIG. 5 illustrates an exemplary screenshot of an user interface, showing an anonymous view of aggregated stances on issues for a jurisdiction, in accordance with an exemplary embodiment of the present invention.

Referring to FIG. 5, a similar example screenshot is shown except that aggregated stances on issues 47 are shown for the jurisdiction. Looking to the figure, a user of the system can determine what percentage of users verified as eligible citizens in this jurisdiction support a particular issue by looking to aggregated stances on issues 47 wherein a percentage is displayed, and a color indicator may indicate whether a simple majority of the eligible citizens support or oppose a particular issue (or a candidate, in an alternative embodiment).

Figure 6:
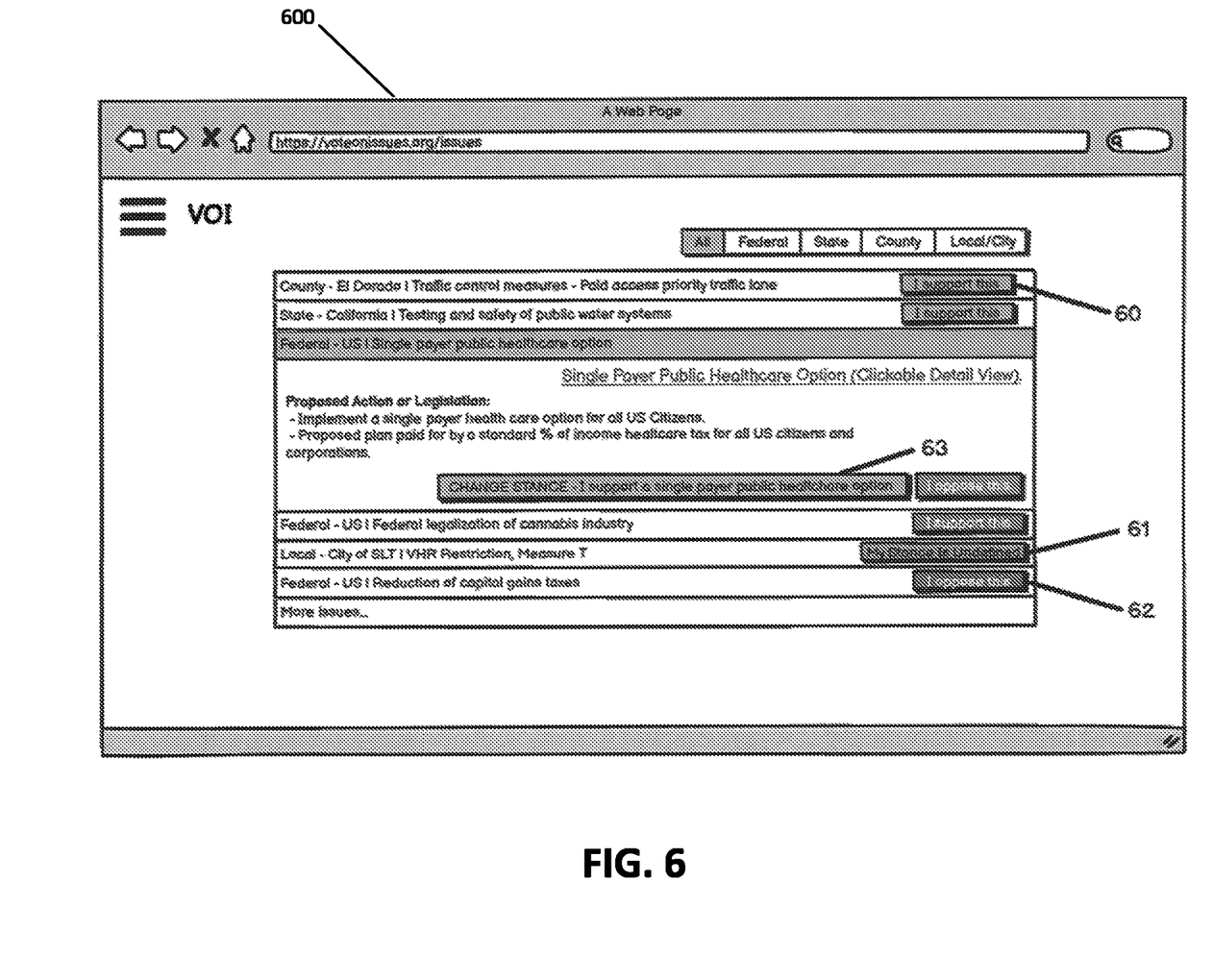
FIG. 6 illustrates an exemplary screenshot of an user interface, showing an authenticated eligible citizen ranking of issues along with stances on the issues, in accordance with an exemplary embodiment of the present invention.

FIG. 6 illustrates an issue list user interface 600, which may, for example, be ranked and sorted by the user's custom issue priority, including the user's stance on the listed issues. A user who is verified as an eligible citizen can record a stance for an issue by selecting a 'I Support This' indicator 60 or an 'I Oppose This' indicator 62. If the user has not indicated a position on the issue, a 'My Stance Is Undefined' indicator 61 is shown to indicate that the system has not received a stance on the issue from the user. A button to change the user's stance 63 is also shown on the expanded issue view. This button 63 allows a user to change their stance on the issue. A confirmation dialog can be presented to confirm that user intended to reverse their stance on the issue.

Figure 7:
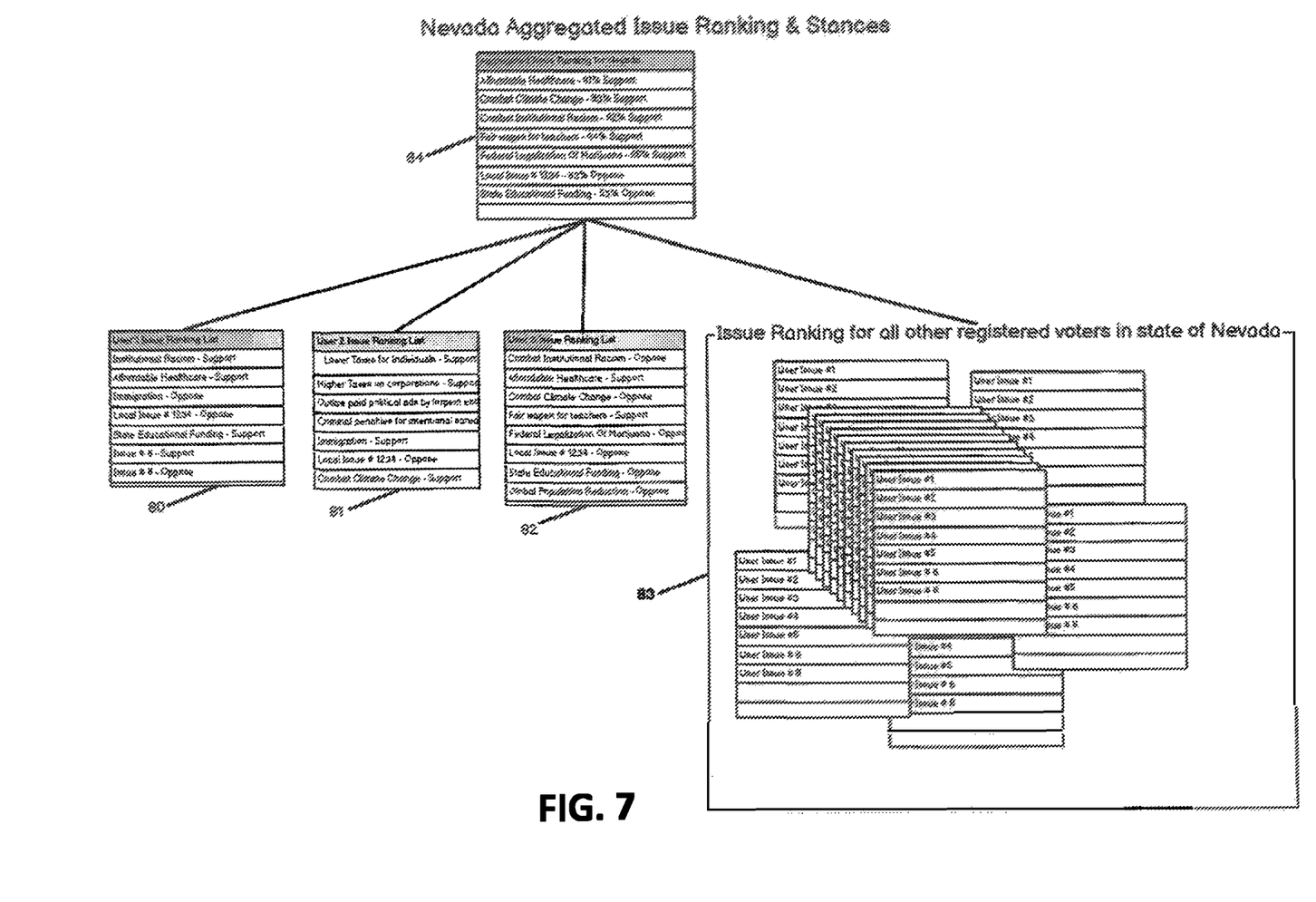
FIG. 7 illustrates an example of aggregated issue prioritization and stances on the issues, aggregated for the State of Nevada, in accordance with an exemplary embodiment of the present invention.

FIG. 7 is an illustration of how stances for an issue, as well as issue ranking, can be aggregated by state; for example, for the state of Nevada. An example User 1's Issue Priority Ranking List 80 is shown to illustrate a sample list of user stances on issues ranked by the user's custom issue priority ranking. A second example of another user (User 2 for illustration purposes) issue stances and custom priority ranking 81 to illustrate the differences between users' issue priority ranking as well as stances. A third user issue priority ranking and stance list 82 is illustrated for User 3. Finally, an array of many other user issue ranking lists 83 is provided to illustrate the concept of aggregating issue priority ranking and stances for all other eligible voters in a particular jurisdiction—in this example, the state of Nevada. The resulting statewide issue priority ranking 84, including percentage of support vs oppose is the result of aggregation of all of the issue ranking and stances for all eligible voting users in the state of Nevada.

Figure 8:
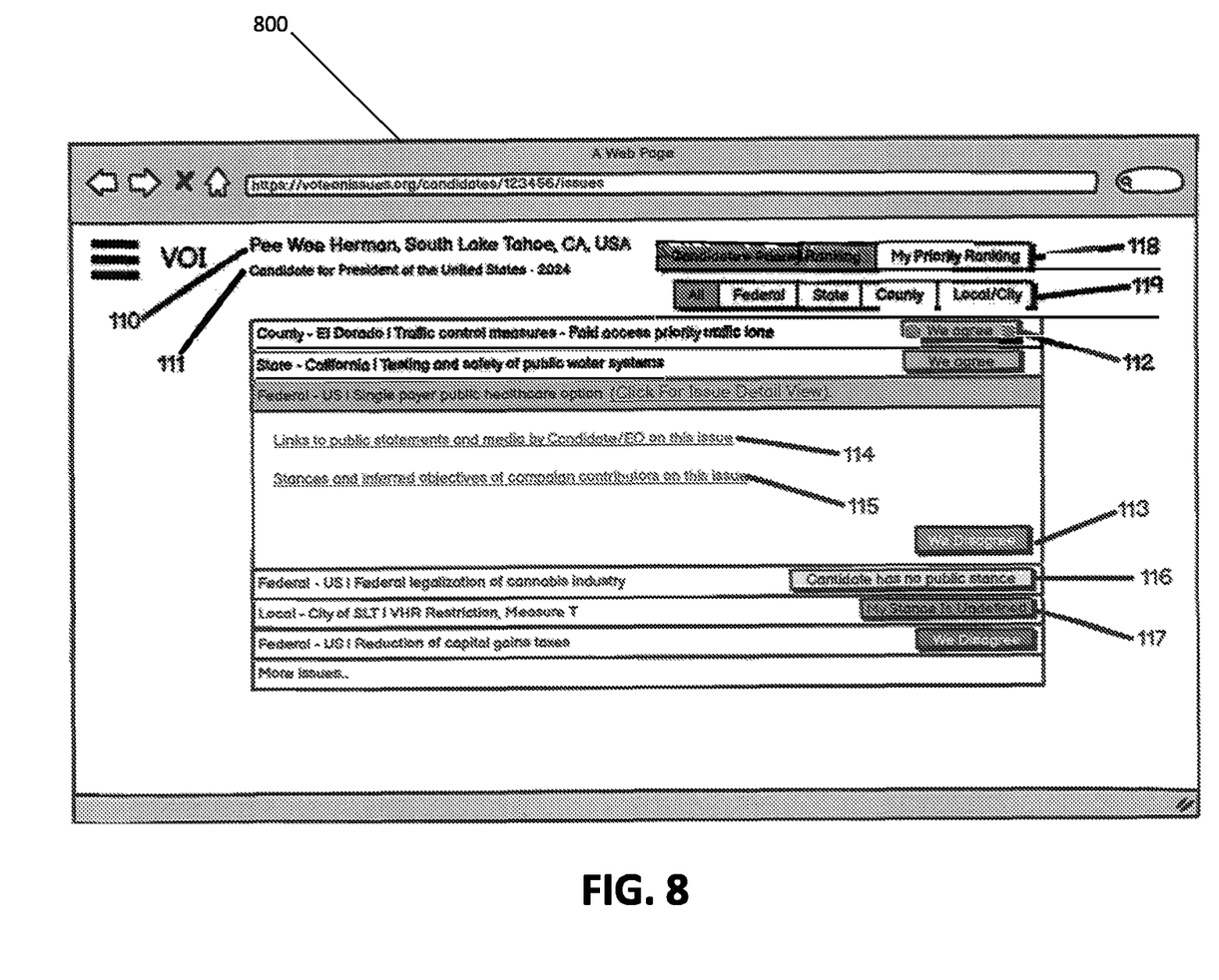
FIG. 8 illustrates an exemplary screenshot of a user interface, showing issue agreement or disagreement between the authenticated user and a candidate for elected office, wherein the issues are presented in rank order according to the candidate for elected office's prioritization, in accordance with an exemplary embodiment of the present invention.

FIG. 8 shows a user interface example of a candidate for elected office list of issues and stances 800. The candidate name and place of residence 110 is displayed at the top of the page. The line below 111 displays the candidate for elected office's current race or office held. The list is by default ranked and sorted by the issue priority ranking chosen and publicly shared by the candidate. A user of the system can reorder the list to be sorted by the user's own personalized issue ranking (if the user is verified as a voting citizen) using the priority ranking selecting 118. Please note that this control is for illustration purposes only and various designs and/or controls could be used to select the list ordering. Issues in the list can also be filtered by jurisdiction, as shown in other issue lists, using the jurisdiction selector 119 (also for illustration purposes only). Within the issue list, a user is shown whether the user agrees or disagrees with a candidate for elected office on the issue in a simple way. The 'We Agree' indicator 112 indicates that the user agrees with the candidate on this issue. If a user disagrees with a candidate for elected office on an issue, this is indicated by an easy to recognize 'We Disagree' indicator 113. In the case that the candidate for elected office has no public stance on an issue, this will also be indicated with an easily recognized 'No Public Stance' indicator 116. If the user has no defined stance on an issue, this will also be shown using an easily recognized 'My Stance Is Undefined' indicator 117. Public statements and media from a candidate for elected office on an issue can also be associated with an issue and aggregated to simplify research on one or more candidates for elected office. The links to public statements and media link 114 can be clicked to a detail page that could include a list of public statements and media by a candidate/EO on the selected issue. The same can be done for entities and individuals that have made major contributions to the candidate for elected office's campaign(s). The 'Stances and inferred objectives of campaign contributors' link 115 can be clicked to view a detail page that shows these known or inferred stances. Links to these public statements, media and campaign contributor's stances/objectives can provide meaningful insight on a candidate for elected office when they have not directly recorded or input a public stance on an issue on the platform.

Figure 9:
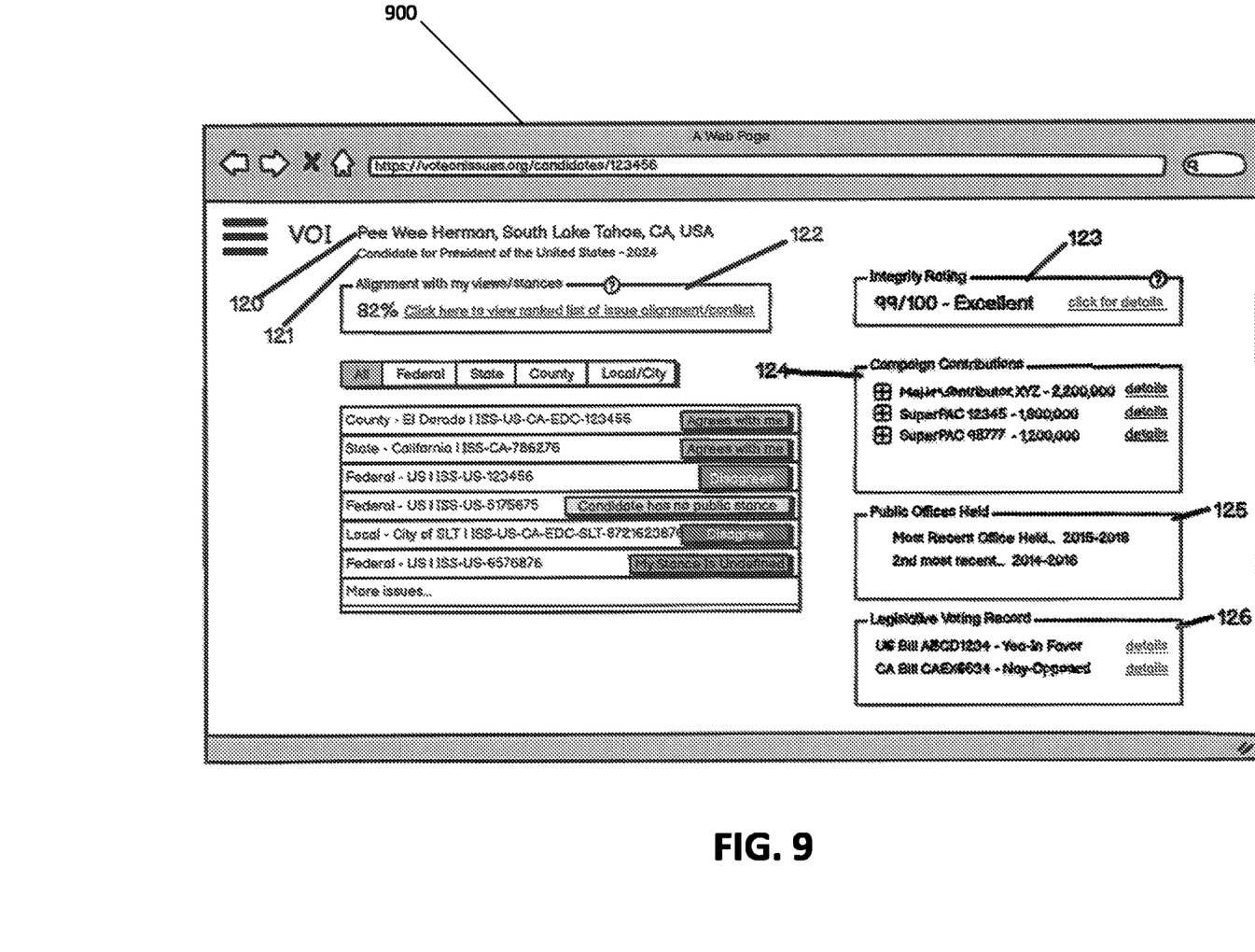
FIG. 9 illustrates an exemplary screenshot of an user interface, showing issue detail for a particular candidate for elected office, wherein an alignment percentage showing a level of alignment between the particular candidate for elected office and the authenticated user is displayed to the authenticated user, in accordance with an exemplary embodiment of the present invention.

FIG. 9 shows an example candidate for elected office overview user interface 900 for an authenticated user who may be an eligible voting citizen. The candidate for elected office's name and place of residence 120 is displayed prominently at the top. The candidate for elected office's current/upcoming race and/or currently held office 121 is displayed below the candidate for elected office's name 120. A summary calculation of issue alignment 122 is shown near the top of the page to give a feel for how well aligned the user's issues stances are aligned with the candidate for elected office's issue stances. A link is included in the issue alignment summary section 122 to view the list of issues and stance alignment shown in FIG. 9. An integrity rating section 123 is also shown to communicate a summary value for the candidate for elected office integrity rating (defined by issue flip flop rates and conflict between issues stances and campaign contributor stances and objectives). A detailed view of factors affecting the candidate for elected office's integrity rating can viewed by clicking the link in this section. A summarized list of major campaign contributors 125 is also displayed. A more detailed view of campaign contributors can be viewed.

Throughout this specification, a user is sometimes described as being an eligible citizen; this phrase eligible citizen (or eligible voting citizen) is intended to include any persons that is able to be verified by the system as being eligible to vote in the upcoming election in the jurisdiction. Eligible citizens are able to utilize the herein disclosed system to compare their own stance on issues and issue prioritization against candidates for elected office to determine alignment or misalignment. User who are not eligible citizens may still be able to view aggregated data regarding stances on issues and issue prioritization, but these uses who are not eligible citizens will not be able to compare their own preferences against candidates.

While certain embodiments of the present invention have been shown and described, it is to be understood that the present invention is subject to many modifications and changes without departing from the spirit and scope of the invention presented herein. Furthermore, while the present invention has been illustrated and described herein in terms of a preferred embodiment and several alternatives, it is to be understood that the systems and/or methods described herein can have a multitude of additional uses and applications. Accordingly, the invention should not be limited to just the particular description and various drawing figures contained in this specification, that merely illustrate a preferred embodiment and application of the principles of the invention. It should be noted that terms of orientation, such as horizontal and vertical and up and down, and direction such as top, bottom, front, rear, etc. as used herein are used to distinguish elements from one another within exemplary embodiments and should therefore not be taken as limiting the scope of the present invention to any specific orientation. Moreover, the use of the terms first, second, etc. do not denote any order or importance, but rather are used to distinguish one element from another. Furthermore, the use of terms a, an, etc. do not denote a limitation of quantity, but rather denote the presence of at least one of the referenced item. Therefore, the detailed description and accompanying drawings are not to be taken in a limiting sense, but rather to enable the present invention.

What is claimed is:

1. A system for aggregating stances on issues for a plurality of voters for a plurality of issues, and for aggregating issue priority ranking for the plurality of issues, to demonstrate issue priority ranking for an electorate, comprising:

a secured multifactor identify verification interface for securely authenticating a user's identity before input is received from the user;

an user interface for receiving one or more inputs from the user and for displaying stances on issues, issue priority ranking, aggregated stances on issues, and aggregated issue priority ranking; wherein the user interface includes a mobile application for receiving the one or more inputs from the user through a mobile device and for displaying the stances on issues issue priority ranking, aggregated stances on issues, and aggregated issue priority ranking on a screen in communication with the mobile device;

a distributed permanent ledger for storing a permanent record of all transactions carried out by the system;

a citizen issue priority ranking and stance interface in communication with the secured multifactor identify verification interface, the user interface, and the distributed permanent ledger so that stances on issues and issue priority ranking of a user who is verified as an eligible citizen by the secured multifactor identify verification interface are recorded in the distributed permanent ledger and retrievable and viewable through the user interface;

wherein the citizen issue priority ranking and stance interface manages business logic required to enable the system to receive issue priority ranking and stances from eligible citizens, and provides reporting on identifiable citizen issue rankings and stance data;

a data access layer that utilizes standardized security protocols and authorizes database transactions after security and authorization has been verified; and a public opinion interface in communication with the secured multifactor identify verification interface, the user interface, and the distributed permanent ledger, so that the public opinion interface accesses the stances on issues and issue priority ranking stored in the distributed permanent ledger and anonymizes and aggregates the stances on issues and issue priority rankings to form aggregated stances on issues and an aggregated issue priority ranking that demonstrates public opinion for specified time periods and for specified jurisdictions and are displayed to the user without individually identifying any one eligible citizen's stances on issues and issue priority ranking.

2. The system as recited in claim 1, wherein a smart contract is defined for each transaction recorded by the system after security and authorization for the transaction has been verified by the secured multifactor identity verification interface.

3. The system as recited in claim 1, further comprising human security processes for authenticating a user by verifying the user's identity.

4. The system as recited in claim 3, wherein the human security processes include a documented rollback of transactions recorded in the distributed permanent ledger in response to a security breach of a user account.

5. The system as recited in claim 1, wherein the distributed permanent ledger is a blockchain.

6. The system as recited in claim 1, wherein the aggregated issue priority rankings are compared to data for a candidate for elected office to determine if the candidate has similar priorities to an electorate.

7. The system as recited in claim 1, wherein the aggregated stances on issues are compared to data for a candidate for elected office to determine if the candidate has similar stances on issues to an electorate.

8. The system as recited in claim 1, wherein data for a candidate for elected office is compared over time to determine an integrity score that reflects how consistent the candidate for elected office has been over a period of time.

9. The system as recited in claim 1, wherein a public servant score is generated by comparing an alignment over time between a candidate for elected office and aggregated public opinion from users who are verified as eligible citizens within a jurisdiction based upon issue stances, issue priority ranking, voting record, legislative record, the citizen and public opinion.

10. The system as recited in claim 1, wherein the issue stances and the issue priority ranking for a user verified as an eligible citizen are compared to stances on issues and the issue priority ranking for a candidate for elected office to determine alignment between the user verified as an eligible citizen and the candidate for elected office.

11. The system as recited in claim 10, wherein the stance and the issue priority ranking for a user verified as an eligible citizen are compared to stances on issues and issue priority rankings for a plurality of candidates for elected office to determine which candidate for elected office is most closely aligned with the verified eligible citizen.

12. The system as recited in claim 1, further comprising:
a candidate for elected office interface enabling reception of candidate data;
wherein the candidate data includes public statements and media on issues; and
the candidate for elected office interface is in communication with the secured multifactor identify verification interface, the user interface, and the distributed permanent ledger so that the candidate data is recorded in the distributed permanent ledger and retrievable and viewable through the user interface.

13. The system as recited in claim 12, wherein the candidate data is inferred or imputed from publicly available information.

14. The system as recited in claim 12, wherein the candidate data is directly input by a candidate for elected office.

15. The system as recited in claim 12, wherein the candidate data is input by another user.

16. The system as recited in claim 12, wherein the candidate for elected office interface further comprises: a link to a detail page showing a list of the candidate data including public statements and media on issues.

17. The system as recited in claim 12, wherein the candidate data further includes documented campaign contributors and stances of the documented campaign contributors.

18. The system as recited in claim 17, wherein the candidate for elected office interface further comprises: a link to a detail page showing a list of the documented campaign contributors and the stances of the documented campaign contributors.

19. The system as recited in claim 1, further comprising:
a relational database for storage of system transactions; and
wherein the relational database provides a permanent ledger of all transactions, including all citizen and candidate issue priority rankings and stances, all changes in issue priority rankings and stances, as well as all security and administrative transactions.

* * * * *